US010102664B1

(12) United States Patent
Payne

(10) Patent No.: US 10,102,664 B1
(45) Date of Patent: Oct. 16, 2018

(54) SYSTEM AND METHOD FOR CAUSING GRAPHICAL INFORMATION TO BE RENDERED

(71) Applicant: Charles Schwab & Co., Inc., San Francisco, CA (US)

(72) Inventor: Sean M. Payne, Austin, TX (US)

(73) Assignee: Charles Schwab & Co., Inc., San Francisco, CA (US)

( * ) Notice: Subject to any disclaimer, the term of this patent is extended or adjusted under 35 U.S.C. 154(b) by 46 days.

(21) Appl. No.: 14/956,121

(22) Filed: Dec. 1, 2015

Related U.S. Application Data

(60) Provisional application No. 62/087,166, filed on Dec. 3, 2014.

(51) Int. Cl.
G06T 15/00 (2011.01)
G06T 15/10 (2011.01)
G06F 3/0481 (2013.01)

(52) U.S. Cl.
CPC ............. G06T 15/10 (2013.01); G06T 15/00 (2013.01); G06F 3/0481 (2013.01)

(58) Field of Classification Search
None
See application file for complete search history.

(56) References Cited

U.S. PATENT DOCUMENTS

| 2006/0242602 | A1* | 10/2006 | Schechter | G06F 9/4443 715/838 |
| 2010/0042945 | A1* | 2/2010 | Bauchot | G06F 3/0481 715/772 |
| 2011/0138295 | A1* | 6/2011 | Momchilov | G06F 9/4445 715/740 |
| 2012/0084713 | A1* | 4/2012 | Desai | G06F 3/0481 715/788 |
| 2015/0339038 | A1* | 11/2015 | Illobre | G06F 3/0481 715/835 |

OTHER PUBLICATIONS

MacDonald, Matthew, Pro WPF, "Introducing WPF." 2007, Chapter 1, pp. 1-13.*

* cited by examiner

Primary Examiner — Ryan M Gray
(74) Attorney, Agent, or Firm — Innovation Partners; Charles E. Gotlieb

(57) ABSTRACT

A system and method uses a two-dimensional graphics library to generate an image representation that can be used by a three-dimensional graphics library to render the image.

24 Claims, 2 Drawing Sheets

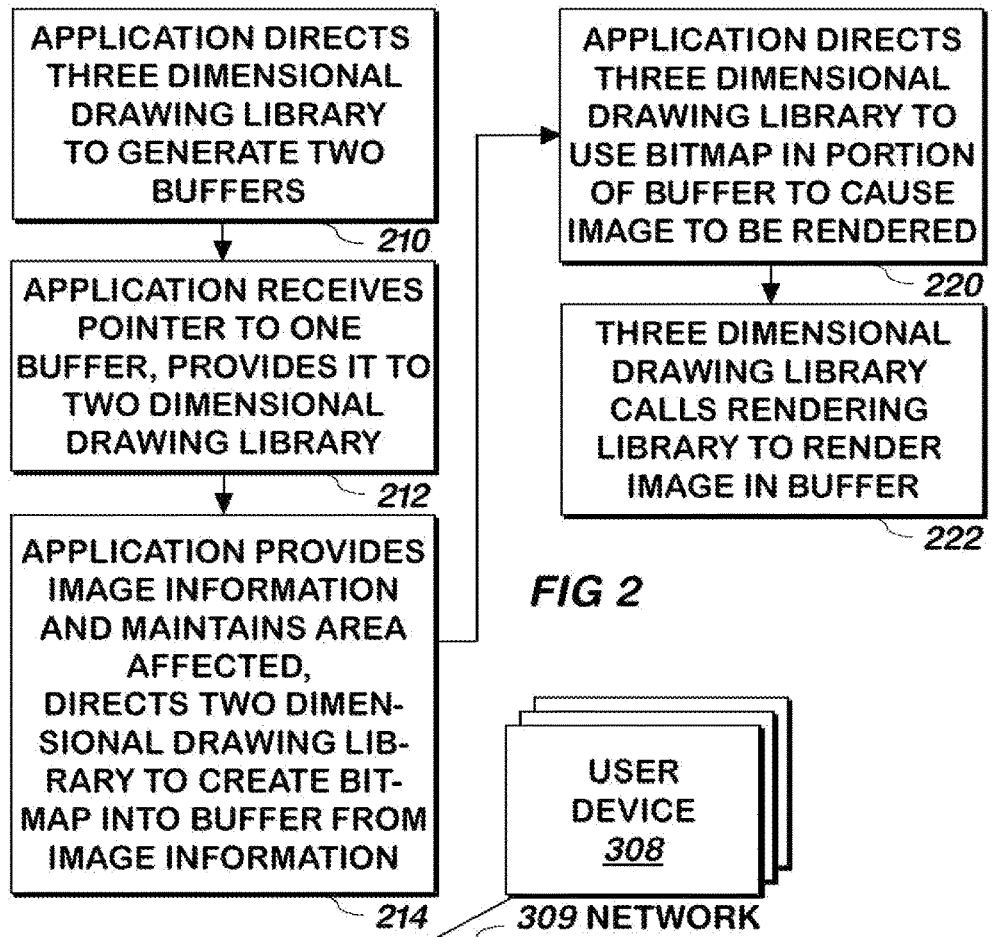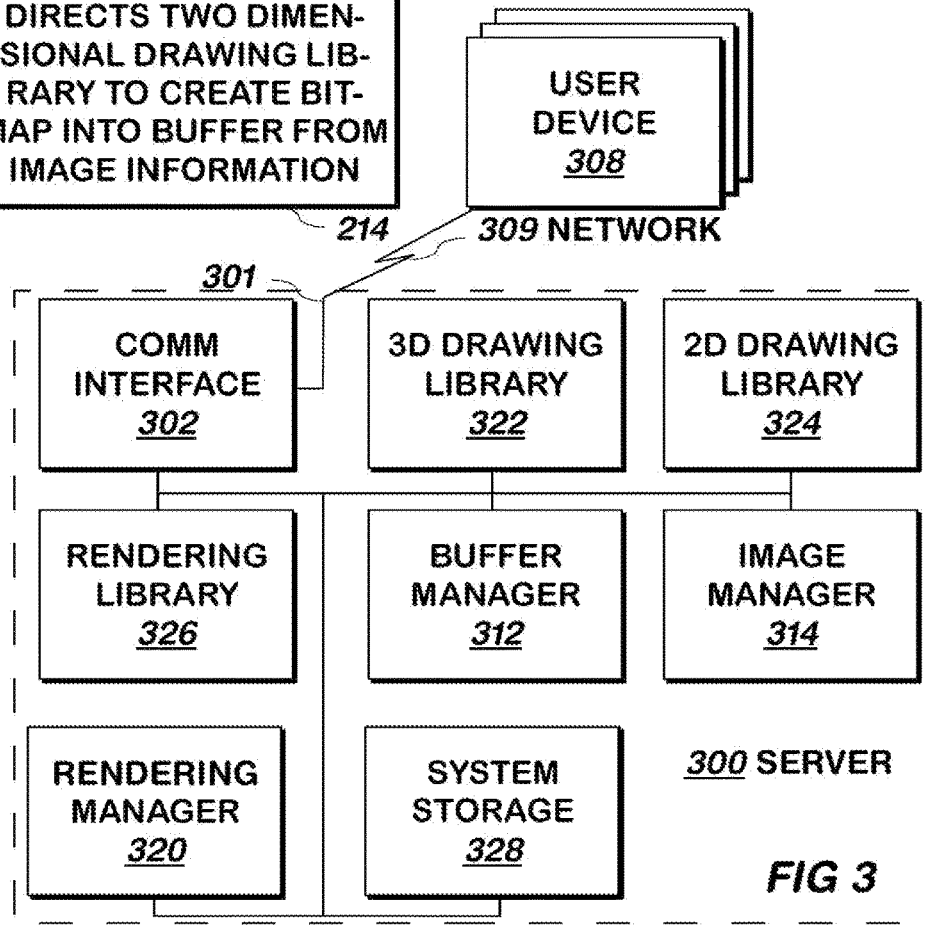

SYSTEM AND METHOD FOR CAUSING GRAPHICAL INFORMATION TO BE RENDERED

RELATED APPLICATION

This application claims the benefit of, U.S. Provisional Patent Application Ser. No. 62/087,166 entitled, "Method and Apparatus for Causing Graphical Information to be Rendered" filed on Dec. 3, 2014 by Sean Payne, and having the same assignee as the present application, and is hereby incorporated by reference in its entirety.

FIELD OF THE INVENTION

The present invention is related to computer hardware and software and more specifically to computer hardware and software for causing graphical information to be rendered.

BACKGROUND OF THE INVENTION

Graphical information includes charts and graphs, such as conventional securities charts and graphs. Conventional methods of rending graphical information operate suboptimally. What is needed is an improved system and method for causing graphical information to be rendered.

SUMMARY OF INVENTION

A system and method uses an application to direct a first drawing library that has three dimensional drawing capabilities as well as drawing specification commands to cause an image to be rendered, by receiving a pointer to a buffer that is created by such library, directing a second drawing library, different from the first drawing library, and that has two dimensional drawing capabilities, to generate a bitmap directly into the buffer using drawing specification commands of the second drawing library, and then commanding the first drawing library to cause some or all of the bitmap in the buffer to be rendered. As the application is using the drawing specification commands of the second drawing library to direct the second drawing library to generate the bitmap, the application identifies the portion of the bitmap changed, and supplies such information to the first drawing library to specify the portion of the bitmap that should be rendered.

BRIEF DESCRIPTION OF THE DRAWINGS

FIG. 2, is a flowchart illustrating a method of causing graphical information to be rendered according to one embodiment of the present invention.

FIG. 3 is a block schematic diagram of a system for causing graphical information to be rendered according to one embodiment of the present invention.

DETAILED DESCRIPTION OF A PREFERRED EMBODIMENT

Figure 1:
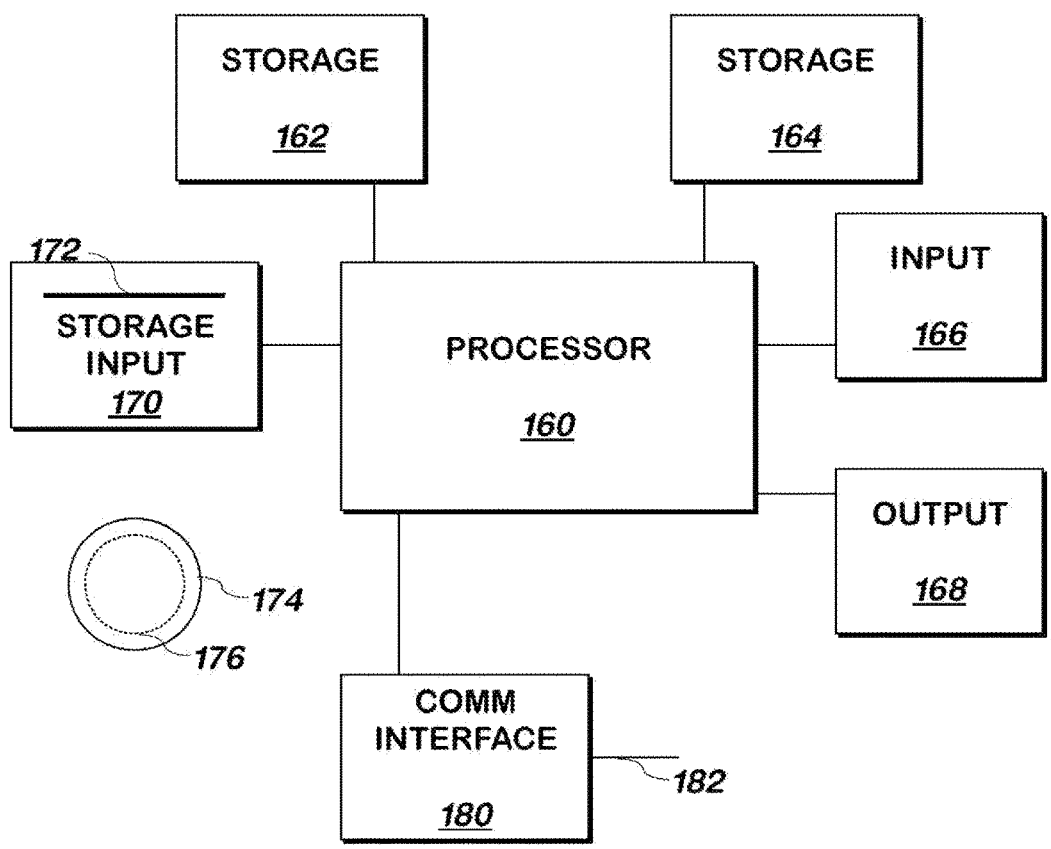
FIG. 1 is a block schematic diagram of a conventional computer system.

The present invention may be implemented as computer software running on a conventional computer system, computer software embodied on a non-transitory storage media, or otherwise. Referring now to FIG. 1, a conventional computer system 150 for practicing the present invention is shown. Processor 160 retrieves and executes software instructions stored in non-transitory storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. All elements of a system including the system described herein include any or all of at least one input, at least one output and at least one input/output. Other system elements may include a conventional hardware computer processor coupled to a memory.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile or non-transitory storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the ORACLE SOLARIS 11 or higher operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, 7 or 8) commercially available from MICROSOFT Corporation of Redmond Wash. or a Macintosh computer system running the OS X operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY S5 commercially available from SAMSUNG ELECTRONICS GLOBAL of Seoul, South Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Referring now to FIG. 2, a method of drawing an image to a computer screen is shown according to one embodiment of the present invention. An application directs a three-dimensional drawing library to generate two buffers 210. In one embodiment, a three-dimensional drawing library is a library of routines capable of drawing in two and three dimensions in response to commands it receives or a bitmap it receives, such as the conventional WPF product commercially available for MICROSOFT CORPORATION of Redmond, Wash. In one embodiment, the three-dimensional drawing library automatically generates the two buffers when it is initially loaded, or called. In another embodiment, a command is required to be sent from the application to the three-dimensional drawing library in order to cause it to generate the two buffers.

The application receives from the three-dimensional drawing library a pointer to one of the two buffers, and provides the pointer to a two-dimensional drawing library 212 as the destination of a bitmap to be rendered from one or more vector-like drawing commands. A two-dimensional drawing library is a drawing library capable of receiving one or more vector-like commands (e.g. draw a line from point A to point B) and converting such one or more commands into a bitmap, such as the conventional GDI+ program commercially available from MICROSOFT CORPORATION of Redmond, Wash.

The application provides image information (e.g. the vector-like commands) to the two-dimensional drawing library and directs the two-dimensional drawing library to create a bitmap corresponding to the image information it received into the buffer whose pointer it received 214.

In one embodiment, the image information is provided using a set of one or more commands to the two-dimensional drawing library, such as a command that instructs the two-dimensional drawing library to draw a line between two points or draw a shape, with an indication of its location, size and any other parameters.

As the commands are provided by the application, as part of step 214, the application identifies an area of the buffer, such as the smallest rectangle, that can make up less than all of the buffer, that will be affected by the drawing commands when they are used to create the bitmap. Directing the two-dimensional drawing library to create the bitmap may be implicit in the drawing commands or may be an explicit set of one or more commands.

The three-dimensional drawing library also contains similar types of commands, and could be operated by the application directly instead of using the two dimensional drawing library as described herein to achieve the same or similar results as those described for the present invention. Thus, the three dimensional drawing library is used "sine-commandedly", meaning without using drawing commands that individually specify the lines or shapes that are built into the bitmap, even though such commands are available and could have been used to achieve the same or similar rendered result.

The application directs the three-dimensional drawing library to use the bitmap in the portion of the buffer to cause an image corresponding to the bitmap in the portion of the buffer to be rendered 220. The three-dimensional drawing library may call a rendering library to render the image in the buffer 222. In one embodiment, the three-dimensional drawing library copies the buffer into the other of the two buffers, and uses such other of the two buffers to cause the image to be rendered. In one embodiment, the rendering library is the conventional DIRECTX product commercially available from MICROSOFT CORPORATION.

System.

Referring now to FIG. 3, a system for rendering images to user devices is shown according to one embodiment of the present invention. System includes server 300, which communicates with one or more user devices 308 to render images on each user device 308. Each user device 308 is coupled to server 300 via network 309, and communication interface 302, including input/output 301. Each user device 308 includes a conventional computer system, which may include a conventional desktop computer system, laptop computer system, or smart device, such as a smart phone or tablet, each such device including a conventional display. Network 309 may include one or more Ethernet networks, and the network that makes up the Internet. Server 300 includes a conventional server system of one or more computer systems, and communication interface 302 includes a conventional TCP/IP-compatible communication interface running suitable communication protocols, such as TCP/IP and Ethernet.

Three-dimensional drawing library 322 includes a conventional three-dimensional drawing library, such as the conventional WPF drawing library described above. Two-dimensional drawing library 324 includes a conventional two-dimensional drawing library such as the conventional GDI+ drawing library described above, which may not include three-dimensional drawing commands or such commands may be included but not be used for the functions described herein. Rendering library 326 is a conventional rendering library, such as the conventional DIRECTX rendering library commercially available from MICROSOFT CORPORATION of Redmond Wash.

Buffer manager 312 receives or retrieves a pointer to a buffer used by three-dimensional drawing library 322, for example by requesting such pointer, or receiving such pointer when buffer manager 312 initiates or loads three-dimensional drawing library 322. The pointer references a portion of system storage 328, which may be conventional memory or disk storage. Buffer manager 312 provides such pointer to image manager 314, which receives it and internally stores it. Image manager 314 provides the pointer to two-dimensional drawing library 324, and supplies vector-like commands that specify one or more lines or other shapes to two-dimensional drawing library 324 according to an application it implements, such as one that provides graphical securities information to the user of the user device 308. Two-dimensional drawing library 324 generates a bitmap representing the one or more lines or other shapes specified by the commands into the buffer of system storage 328 corresponding to the pointer it received.

As image manager 314 supplies the various commands described above, image manager 314 identifies boundaries of an area of the buffer of system storage 322 containing the results of such commands. The boundaries may represent the smallest rectangle that contains an area of the buffer that will be changed as a result of the commands since the buffer was initialized or last rendered as described herein.

When image manager 314 has completed supplying the commands corresponding to the bitmap it desires to be produced, image manager 314 provides the boundaries of the area described above to rendering manager 320. When it receives such boundaries, rendering manager 320 instructs three-dimensional drawing library 322 to render the portion of the buffer corresponding to the boundaries, and provides such boundaries as part of such instruction. When it receives such instruction, three-dimensional drawing library 322 instructs rendering library 326 to render an image using the bitmap contained within the boundaries of the buffer, and provide the image for display to the user device 308, and three-dimensional drawing library 322, and rendering library 326, comply with such instruction.

Summary.

Described is a method of rendering an image, including the steps of causing a first drawing program that has a capability to draw in three dimensions to generate a first buffer in a computer storage system and a second buffer in the computer storage system; receiving an identifier of the first buffer from the first drawing program; providing the identifier of the first buffer and a plurality of commands to a second drawing program, that is different from the first drawing program and does not have a capability to draw in three dimensions to cause the second drawing program to generate a bitmap image into the first buffer, the bitmap image containing at least one line or shape; responsive to at least some of the plurality of commands, identifying an area of the first buffer that has or will be changed as a result of the second drawing program executing the plurality of commands; and providing an indication of the area to the first drawing program, and causing the first drawing program to render an image using the area of the first buffer; and wherein the first drawing program can process commands that allow the same image to be rendered by the first drawing program without use of the second drawing program.

The method has an optional additional feature whereby the causing the first drawing program to generate the first buffer and the second buffer is or includes loading into memory, or calling, the first drawing program.

The method has an optional additional feature whereby the first drawing program is caused to render the image additionally using the second buffer.

The method has an optional additional feature whereby the second drawing program does not generate the bitmap into the second buffer.

The method has an optional additional feature whereby the first drawing program is or includes WPF.

The method has an optional additional feature whereby the second drawing program is or includes DIRECTX.

Described is a system for rendering an image, including the following components, each optionally including a hardware processor system coupled to a memory system: a buffer manager for causing at an output a first drawing program that has a capability to draw in three dimensions to generate a first buffer in a computer storage system and a second buffer in the computer storage system, for receiving at an input an identifier of the first buffer from the first drawing program, and for providing at the buffer manager output the identifier of the first buffer; an image manager having an input coupled to the buffer manager output for receiving the identifier of the first buffer, the image manager for providing at an output the identifier of the first buffer and a plurality of commands to a second drawing program, that is different from the first drawing program and does not have a capability to draw in three dimensions, to cause the second drawing program to generate a bitmap image into the first buffer, the bitmap image containing at least one line or shape, the image manager additionally for, responsive to at least some of the plurality of commands, identifying an area of the first buffer that has or will be changed as a result of the second drawing program executing the plurality of commands, and for providing at the image manager output information describing boundaries of the area identified; and a rendering manager having an input coupled to the image manager output for receiving the information describing boundaries of the area identified, the rendering manager for providing at an output an indication of the boundaries to the first drawing program, and for causing via the rendering manager output the first drawing program to render an image using the area of the first buffer; and wherein the first drawing program can process commands that allow the same image to be rendered by the first drawing program without use of the second drawing program.

The system of has an optional additional feature whereby buffer manager causes the first drawing program to generate the first buffer and the second buffer by loading into memory, or calling, the first drawing program.

The system has an optional additional feature whereby the rendering manager causes the first drawing program to render the image additionally using the second buffer.

The system has an optional additional feature whereby the second drawing program does not generate the bitmap into the second buffer.

The system has an optional additional feature whereby the first drawing program is or includes WPF.

The system has an optional additional feature whereby the second drawing program is or includes DIRECTX.

Described is a computer program product including a non-transitory computer useable medium having computer readable program code embodied therein for rendering an image, the computer program product including computer readable program code devices configured to cause a computer system to cause a first drawing program that has a capability to draw in three dimensions to generate a first buffer in a computer storage system and a second buffer in the computer storage system; receive an identifier of the first buffer from the first drawing program; provide the identifier of the first buffer and a plurality of commands to a second drawing program, that is different from the first drawing program and does not have a capability to draw in three dimensions to cause the second drawing program to generate a bitmap image into the first buffer, the bitmap image containing at least one line or shape; responsive to at least some of the plurality of commands, identify an area of the first buffer that has or will be changed as a result of the second drawing program executing the plurality of commands; and provide an indication of the area to the first drawing program, and causing the first drawing program to render an image using the area of the first buffer; and wherein the first drawing program can process commands that allow the same image to be rendered by the first drawing program without use of the second drawing program.

The computer program product has an optional additional feature whereby the computer readable program code devices configured to cause the computer system to cause the first drawing program to generate the first buffer and the second buffer comprise computer readable program code devices configured to cause the computer system to load into memory, or call, the first drawing program.

The computer program product has an optional additional feature whereby the first drawing program is caused to render the image additionally using the second buffer.

The computer program product has an optional additional feature whereby the second drawing program does not generate the bitmap into the second buffer.

The computer program product has an optional additional feature whereby the first drawing program is or includes WPF.

The computer program product has an optional additional feature whereby the second drawing program is or includes DIRECTX.

What is claimed is:

1. A method of rendering an image, comprising:
    causing a first drawing program that has a capability to draw in three dimensions to generate a first buffer in a computer storage system and a second buffer in the computer;
    storage system;
    receiving an identifier of the first buffer from the first drawing program;
    providing the identifier of the first buffer and a plurality of commands to a second drawing program, that is different from the first drawing program and does not have a capability to draw in three dimensions to cause the second drawing program to generate a bitmap image into the first buffer, the bitmap image containing at least one line or shape;

responsive to at least some of the plurality of commands, identifying an area comprising less than all of the first buffer that has or will be changed as a result of the second drawing program executing the plurality of commands; and providing an indication of the area to the first drawing program, and causing the first drawing program to render an image using the area of the first buffer; and wherein the first drawing program can process commands that allow the image to be rendered by the first drawing program without use of the second drawing program.

2. The method of claim 1, wherein the causing the first drawing program to generate the first buffer and the second buffer comprises loading into memory, or calling, the first drawing program.

3. The method of claim 1, wherein the first drawing program is caused to render the image additionally using the second buffer.

4. The method of claim 3, wherein the second drawing program does not generate the bitmap image into the second buffer.

5. The method of claim 1, wherein the first drawing program comprises WPF.

6. The method of claim 1, wherein the second drawing program comprises GDI+.

7. A system for rendering an image, comprising:
a buffer manager for causing at an output a first drawing program that has a capability to draw in three dimensions to generate a first buffer in a computer storage system and a second buffer in the computer storage system, for receiving at an input an identifier of the first buffer from the first drawing program, and for providing at the buffer manager output the identifier of the first buffer;

an image manager having an input coupled to the buffer manager output for receiving the identifier of the first buffer, the image manager for providing at an output the identifier of the first buffer and a plurality of commands to a second drawing program, that is different from the first drawing program and does not have a capability to draw in three dimensions, to cause the second drawing program to generate a bitmap image into the first buffer, the bitmap image containing at least one line or shape, the image manager additionally for, responsive to at least some of the plurality of commands, identifying an area comprising less than all of the first buffer that has or will be changed as a result of the second drawing program executing the plurality of commands, and for providing at the image manager output information describing boundaries of the area identified; and a rendering manager having an input coupled to the image manager output for receiving the information describing boundaries of the area identified, the rendering manager for providing at an output an indication of the boundaries to the first drawing program, and for causing via the rendering manager output the first drawing program to render an image using the area of the first buffer; and wherein the first drawing program can process commands that allow the image to be rendered by the first drawing program without use of the second drawing program.

8. The system of claim 7, wherein the buffer manager causes the first drawing program to generate the first buffer and the second buffer by loading into memory, or calling, the first drawing program.

9. The system of claim 7, wherein the rendering manager causes the first drawing program to render the image additionally using the second buffer.

10. The system of claim 9, wherein the second drawing program does not generate the bitmap image into the second buffer.

11. The system of claim 7, wherein the first drawing program comprises WPF.

12. The system of claim 7, wherein the second drawing program comprises GDI+.

13. A computer program product comprising a nontransitory computer useable medium having computer readable program code embodied therein for rendering an image, the computer program product comprising computer readable program code devices configured to cause a computer system to:

cause a first drawing program that has a capability to draw in three dimensions to generate a first buffer in a computer storage system and a second buffer in the computer storage system;

receive an identifier of the first buffer from the first drawing program;

provide the identifier of the first buffer and a plurality of commands to a second drawing program, that is different from the first drawing program and does not have a capability to draw in three dimensions to cause the second drawing program to generate a bitmap image into the first buffer, the bitmap image containing at least one line or shape;

responsive to at least some of the plurality of commands, identify an area comprising less than all of the first buffer that has or will be changed as a result of the second drawing program executing the plurality of commands; and provide an indication of the area to the first drawing program, and causing the first drawing program to render an image using the area of the first buffer; and wherein the first drawing program can process commands that allow the image to be rendered by the first drawing program without use of the second drawing program.

14. The computer program product of claim 13, wherein the computer readable program code devices configured to cause the computer system to cause the first drawing program to generate the first buffer and the second buffer comprise computer readable program code devices configured to cause the computer system to load into memory, or call, the first drawing program.

15. The computer program product of claim 13, wherein the first drawing program is caused to render the image additionally using the second buffer.

16. The computer program product of claim 15, wherein the second drawing program does not generate the bitmap image into the second buffer.

17. The computer program product of claim 13, wherein the first drawing program comprises WPF.

18. The computer program product of claim 13, wherein the second drawing program comprises GDI+.

19. The method of claim 1, wherein the area comprises a rectangle.

20. The method of claim 19, wherein the rectangle comprises a substantially smallest rectangle that has or will be changed as a result of the second drawing program executing the plurality of commands.

21. The system of claim 7, wherein the area comprises a rectangle.

22. The system of claim 21, wherein the rectangle comprises a substantially smallest rectangle that has or will be changed as a result of the second drawing program executing the plurality of commands.

23. The computer program product of claim 13, wherein the area comprises a rectangle.

24. The computer program product of claim 23, wherein the rectangle comprises a substantially smallest rectangle that has or will be changed as a result of the second drawing program executing the plurality of commands.

* * * * *